United States Patent [19]

Kokeguchi

[11] Patent Number: 5,433,475
[45] Date of Patent: Jul. 18, 1995

[54] AIR BAG DEVICE FOR ASSISTANT DRIVER'S SEAT FOR PROVIDING UNIFORM AIR PRESSURE

[75] Inventor: Akira Kokeguchi, Shiga, Japan
[73] Assignee: Takata Corporation, Tokyo, Japan
[21] Appl. No.: 909,705
[22] Filed: Jul. 7, 1992
[30] Foreign Application Priority Data Jul. 26, 1991 [JP] Japan .................. 3-187330

[51] Int. Cl.⁶ ............................................. B60R 21/26
[52] U.S. Cl. ............................. 280/736; 102/531; 280/737; 280/738; 280/740; 280/742
[58] Field of Search ............... 280/730, 736, 737, 738, 280/740, 742; 102/530, 531; 422/164

[56] References Cited

U.S. PATENT DOCUMENTS

| 3,778,084 | 12/1973 | Sutherland et al. | 102/37.7 |
| 4,213,635 | 7/1980 | Inokuchi et al. | 280/742 |
| 4,846,368 | 7/1989 | Goetz | 280/736 |
| 4,886,293 | 12/1989 | Weiler et al. | 280/736 |
| 5,054,811 | 10/1991 | Unterforsthuber et al. | 102/530 |

FOREIGN PATENT DOCUMENTS 2136456 12/1972 France .
3733436 4/1988 Germany .
58-110339 6/1983 Japan .................. 280/730
2022194 12/1979 United Kingdom ........... 280/740

*Primary Examiner*—Eric D. Culbreth
*Attorney, Agent, or Firm*—Kanesaka & Takeuchi

[57] ABSTRACT

An air bag device for an assistant driver's seat is formed of a container having an opening for expanding an air bag on the front surface and intake ports for inletting air on the side surfaces; a lid covering the opening; valve plates provided in the container for closing the intake ports an air bag accommodated in the container in the folded state; a gas generator first gas ejecting holes for ejecting gas toward the front surface of the container and second gas ejecting holes for ejecting gas toward the valve plates; and a sealing device attached on the gas generator for sealing the first and second ejecting holes. The sealing device opens only at first gas ejecting hole portions when ejected gas pressure in the gas generator exceeds first predetermined pressure thereby allowing the gas and air flowing through the intake ports to open the air bag. The sealing device opens further at the second gas ejecting hole portions when ejected gas pressure exceeds a second gas pressure higher than the first gas pressure thereby allowing the gas to close the valve plate.

6 Claims, 3 Drawing Sheets

AIR BAG DEVICE FOR ASSISTANT DRIVER'S SEAT FOR PROVIDING UNIFORM AIR PRESSURE

FIELD OF THE INVENTION

The present invention relates to an air bag device for an assistant driver's seat, and specifically, to an air bag device capable of expanding an air bag at approximately uniform speed even when ejected gas pressure of a gas generator (hereinafter, may be referred to as generator) is varied with environment temperature.

DESCRIPTION OF THE RELATED ART

An air bag device for an assistant driver's seat is used to protect an occupant seated on an assistant driver's seat, that is, next to a driver's seat of a vehicle from shock caused by crash of the vehicle or the like. As is well known, the air bag device is so constituted that, when a vehicle suffers a large acceleration caused by crash thereof or the like, a gas generator rapidly ejects gas to expand an air bag.

A conventional air bag device for an assistant driver's seat will be described with reference to FIG. 2.

FIG. 2 is a vertical cross-sectional view of a conventional air bag device for an assistant driver's seat, wherein there is shown an air bag 10 expanded in an interior of a vehicle by forcibly opening a lid 15.

Before being expanded, the air bag 10 is folded and accommodated in a holding box 12 referred to as a container. The container 12 has an opening 14 on its front surface for allowing the air bag 10 to expand therethrough into interior of the vehicle. The opening 14 is covered with a lid 15. The air bag 10 is fixed at the base ends thereof to the circumferential edge portions of the opening 14 of the container 12 by bolts 18 and nuts 20 through reinforcing plates 16. A gas generator 22 is mounted on the rear wall of the container 12 facing to the opening 14. In the conventional device as shown in this figure, the rear wall of the container 12 is outwardly curved in an arc shape thus forming a generator holding portion 24. The cylindrical gas generator 22 is fitted to this generator holding part 24.

The gas generator 22 includes a cylindrical casing 32 internally charged with chemical materials capable of rapidly generating gas. The casing 32 is provided with gas ejecting holes 34 for ejecting gas in the container 12. In addition, a metal made seal tape 38 is stuck on the inner surface of the casing 32 so as to seal the ejecting holes 34. The seal tape 38 is broken with the gas generated by actuation of the generator 22, thus allowing the gas to eject through the gas ejecting holes 34.

A plurality of intake ports 40 are provided on the upper and lower walls of the container 12. Also, there are provided valve plates 42 for covering the intake ports 40 on the inner surface of the container 12. Each valve plate 42 is fixed at the base end side thereof to the container 12 by the bolt 30. The valve plate 42 is made flexible at a base end portion 42a thereof. Consequently, the valve plate 42 is overlapped to (for closing the intake ports) or separated from (for opening the intake ports) the inner surface of the container 12 at the free end side portion rather than the base end portion 42a thereof.

When gas passing through the gas ejecting holes 34 is ejected in the container 12 to expand the air bag 10, the atmospheric air pushes the valve plates 42 and is thus allowed to flow in the container 12 through the intake ports 40. The air bag 10 is therefore rapidly expanded. In other words, the valve plate 42 serves as a valve of an aspirator.

The generation of gas in the generator 22 is due to reaction between chemical materials. Accordingly, the higher the environment temperature becomes, the larger both the reaction speed and gas pressure become. Conversely, the lower the environment temperature becomes, the smaller both the reaction speed and gas pressure become. Specifically, the higher the environment temperature becomes, the larger the speed of gas passing through the gas ejecting holes 34, that is, the expanding speed of the air bag 10 becomes. Conversely, the lower the environment temperature becomes, the smaller the expanding speed of the air bag 10 becomes. Such a large or small change in expanding speed of the air bag 10 exerts effect on fluctuation in a protective characteristic depending on the air bag 10. Therefore, the expanding speed of the air bag 10 is preferably made uniform.

Since the gas pressure in the generator 22 becomes larger with increase in environment temperature, the casing 32 of the generator 22 needs the enlarged wall thickness and high strength enough to withstand such a high gas pressure. Thus, the conventional air bag device has a disadvantage of increasing the fabrication cost of the generator 22 and enlarging the capacity and weight thereof because of the enlarged wall thickness.

OBJECTS AND SUMMARY OF THE INVENTION

An object of the present invention is to provide an air bag device for an assistant driver's seat wherein the expanding speed thereof is made approximately uniform even when the environment temperature is varied thereby keeping the protective function of an assistant driver approximately constant despite variation in environment temperature.

Another object of the present invention is to provide an air bag device for an assistant driver's seat capable of reducing pressure resistance required to a casing of a gas generator thereby making the wall thickness of the casing small, which reduces the fabrication cost of the gas generator and also makes the capacity and weight of the generator small by the reduced wall thickness.

A further object of the present invention is to provide an air bag device for an assistant driver's seat wherein the capacity of the gas generator is reduced thus reducing the capacity of the air bag device.

An air bag device according to the present invention comprises: a container having an opening for expanding an air bag on the front surface and intake ports for inhaling air through side surfaces; a lid covering the opening; valve plates provided in the container for closing the intake ports by being overlapped on the side surfaces of the container and opening the intake ports by being separated therefrom; an air bag accommodated in the container in the folded state; a gas generator fixed on the rear surface portion of the container facing to the opening; first gas ejecting holes provided in the gas generator for ejecting gas toward the front surface of the container and second gas ejecting holes provided in the gas generator for ejecting gas toward the valve plates; and sealing means attached on the gas generator for sealing the first and second ejecting holes, wherein the sealing means is broken at first gas ejecting hole portions when ejected gas pressure in the gas generator exceeds first predetermined pressure thereby allowing the gas to pass through the first gas ejecting holes to be ejected toward the front surface of the container, whereas the sealing means is broken at the second gas ejecting hole portions when ejected gas pressure exceeds a second gas pressure higher than the first gas pressure thereby allowing the gas to pass through the second gas ejecting holes to be ejected toward the valve plates.

The sealing means includes a synthetic resin or metal foil tape, and is preferably stuck on the portion of the ejecting hole by bonding agent or pressure sensitive adhesive.

In the air bag device mentioned above, when the generator is actuated to generate gas, the gas is ejected into the container through the gas ejecting holes, thus expanding the air bag.

In this case, since the generated gas pressure in the generator is relatively low in low environment temperatures, the sealing means is broken only at the portion covering the first gas ejecting holes having a large opening area thereby allowing the gas in the gas generator to be ejected in the container through only the first gas ejecting holes. The first gas ejecting holes are opened to the front surface of the container, so that the gas from the first gas ejecting holes is almost acted as a gas pressure for expanding the air bag thereby expanding the air bag at the predetermined high speed. Incidentally, in this case, the valve plates covering the intake ports are opened thus allowing the atmospheric air to flow in the container, to expand the air bag at a sufficient high speed.

The higher the environment temperature becomes, the larger the generated gas pressure in the generator becomes. In this case, the sealing means covering the second gas ejecting holes having the small opening areas is also broken which allows the generated gas in the generator to be ejected into the container through not only the first gas ejecting holes but also the second gas ejecting holes. The gas ejected into the container through the second gas ejecting holes exerts the valve plate to be pushed on the inner surface of the container thereby making the valve plates in proximity of the intake ports or to close at least part of the intake ports thereof. Consequently, the amount of air flowing into the container through the intake ports is reduced. As a result, even when a large amount of gas is ejected in the container through the first gas ejecting holes, the air bag is expanded at not excessive large speed but suitably and sufficiently large speed because of the reduced amount of air inletted from the intake ports.

As mentioned above, in the air bag for assistant driver's seat according to the present invention, even when the environment temperature is varied, the air bag is usually expanded at an approximately uniform speed. This stabilizes the protective characteristic of the air bag.

When the generated gas pressure in the generator is enlarged, the gas is ejected from not only the first gas ejecting holes but also the second gas ejecting holes, which prevents gas pressure exerted to the casing of the generator from being excessively increased. Accordingly, it is possible to thin the wall thickness of the casing of the generator and reduce a pressure resistance of the casing. This enables reductions both in the fabrication cost of the generator and in the capacity and weight of the generator because of the reduced wall thickness.

PREFERRED EMBODIMENTS

Figure 1:
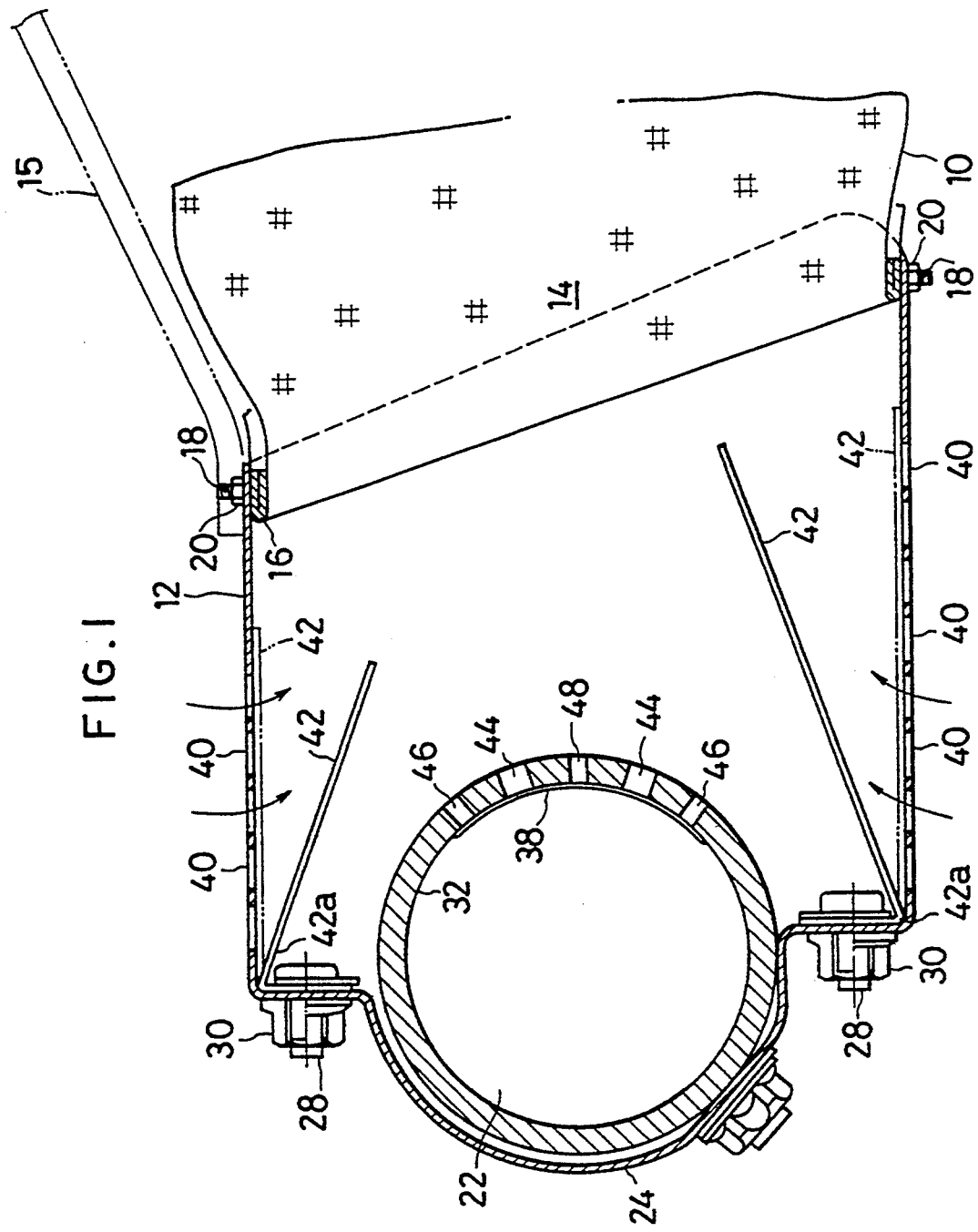
FIG. 1 is a cross-sectional view of an air bag device for an assistant driver's seat according to an embodiment.

Hereinafter the embodiments will be described in detail with reference to the accompanying drawings:

FIG. 1 is a cross-sectional view of an air bag device for an assistant driver's seat according to the present invention. In this embodiment, a casing 32 of a generator 22 is provided with first gas ejecting holes 44 and second gas ejecting holes 46. The first gas ejecting holes 44 face to an opening 14 of the front surface of the container 12. The second gas ejecting holes 46 are opened to valve plates 42. The opening area of the second gas ejecting hole 46 are made smaller than that of the first gas ejecting hole 44. Incidentally, in this embodiment, there is provided a third gas ejecting hole 48 opened to the opening 14. The opening area of the third gas ejecting hole 48 is made smaller than that of the first gas ejecting hole 44. These gas ejecting holes 44, 46 and 48 are covered with a sealing tape 38. The tape 38 has a uniform thickness as a whole and is made of, preferably, synthetic resin or metal foil.

Figure 2:
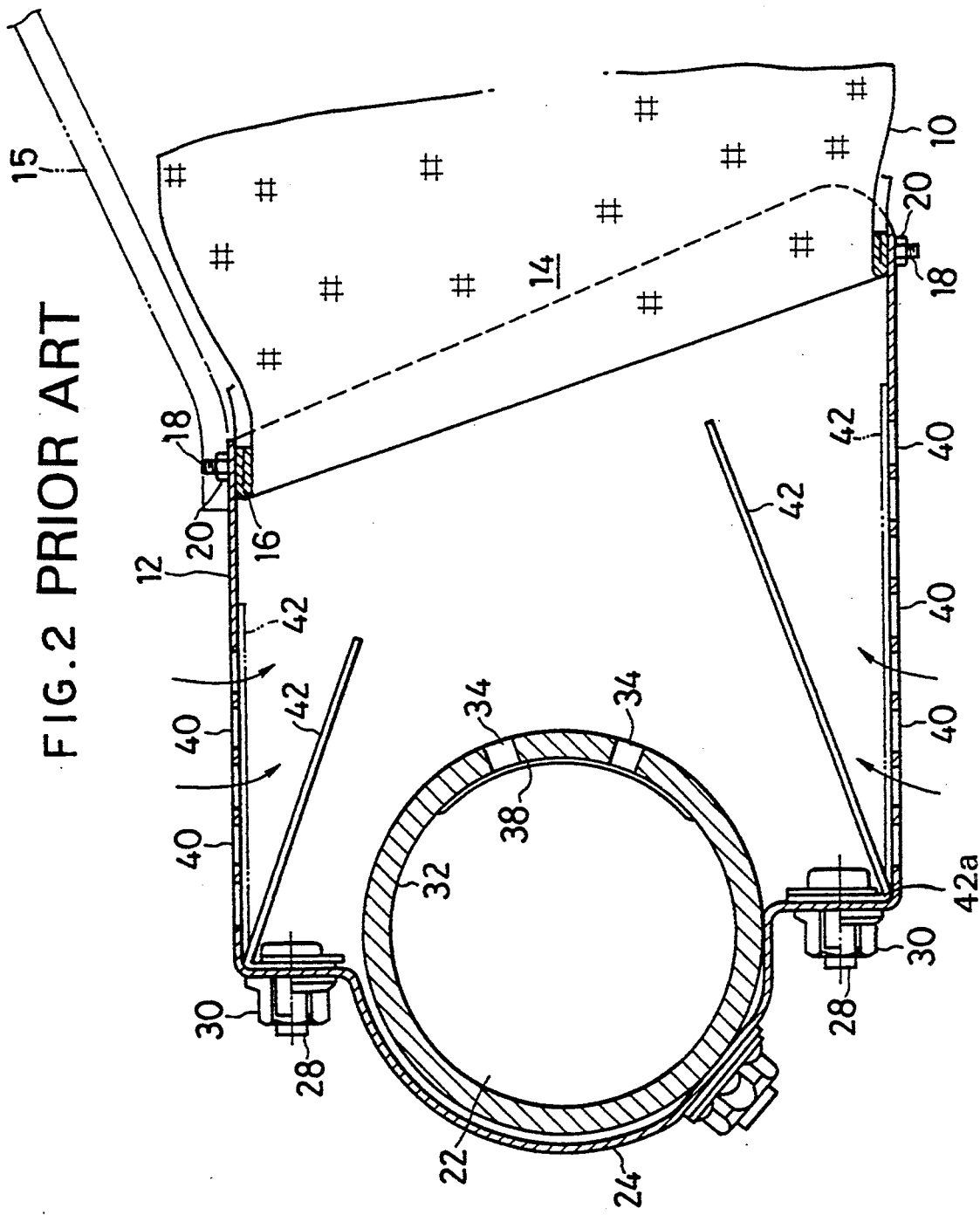
FIG. 2 is a cross-sectional view of an air bag device for an assistant driver'seat according to the prior art.

The other construction of FIG. 1 is similar to that shown in FIG. 2, and the same parts are indicated at the same numerals.

In the air bag device for an assistant driver's seat thus constructed, the generator 22 is actuated to generate gas under reaction between chemical materials. When the environment temperature is low, the generated gas pressure becomes low and the sealing tape 38 is broken at only the portion covering the first gas ejecting holes 44 thus allowing the gas to be ejected in the container 12 through only the first gas ejecting holes 44. Namely, the first gas ejecting hole 44 has an opening area larger than that of the second gas ejecting hole 46 or third ejecting hole 48, and consequently the seal tape 38 applied with the gas pressure is first broken at the portions covering the first gas ejecting holes 44. Since the gas from the first gas ejecting holes 44 is mainly ejected toward the opening 14, the air bag is rapidly expanded. Furthermore, the atmospheric air passing through the intake ports 40 pushes the valve plates 42 and is allowed to flow in the container 12. As a result, the air bag 10 is expanded at a sufficient high speed under the ejected gas pressure and by the inflow of the atmospheric air.

When the generator 22 is actuated in a high environment temperature, the gas pressure in the generator 22 becomes relatively higher. In this case, the seal tape 38 is broken at the portions covering the second ejecting holes 46 and the third ejecting hole 48, so that the generated gas in the generator 22 is ejected in the container 12 through not only the first gas ejecting holes 44 but also the second ejecting holes 46 and the third gas ejecting hole 48. The gas passing through the second gas ejecting holes 46 pushes the valve plates 42 to the inner surface of the container 12. As a result, the atmospheric air intended to flow in the container 12 through the intake ports 40 is reduced and thereby the air bag 10 is expanded mainly by the gas ejected from the generator 22. Therefore, the air bag 10 is expanded at not excessively high speed but a speed equal to that obtained in a low environment temperature.

In this embodiment, since gas is also ejected from the third gas ejecting hole 48, the air bag 10 is expanded at a sufficiently high speed even when the atmospheric air from the intake ports 40 is perfectly cut-off.

The gas ejected from the second gas ejecting holes 46 exerts the valve plates 42 to be pushed on the inner surface of the container 12. In this case, when the amount of the gas ejected from the ,second gas ejecting holes 46 is sufficiently higher, the valve plates 42 are perfectly overlapped on the inner surface of the container 12 thus closing all of the intake ports 40. When the amount of the gas ejected from the second gas ejecting holes 46 is smaller than the above case, the valve plates 42 close for only a part of the intake ports, thereby allowing the atmospheric air to slightly flow in the container 12. Even when the valve plates 42 close all of the intake ports 40, they are slightly separated from the intake ports 40 thus allowing the atmospheric air to flow into the container little by little from all of the intake ports 40.

The embodiment mentioned above includes the third gas ejecting hole 48; however, it may be omitted, that is, the first and second ejecting holes 44 and 46 may be provided.

Figure 3:
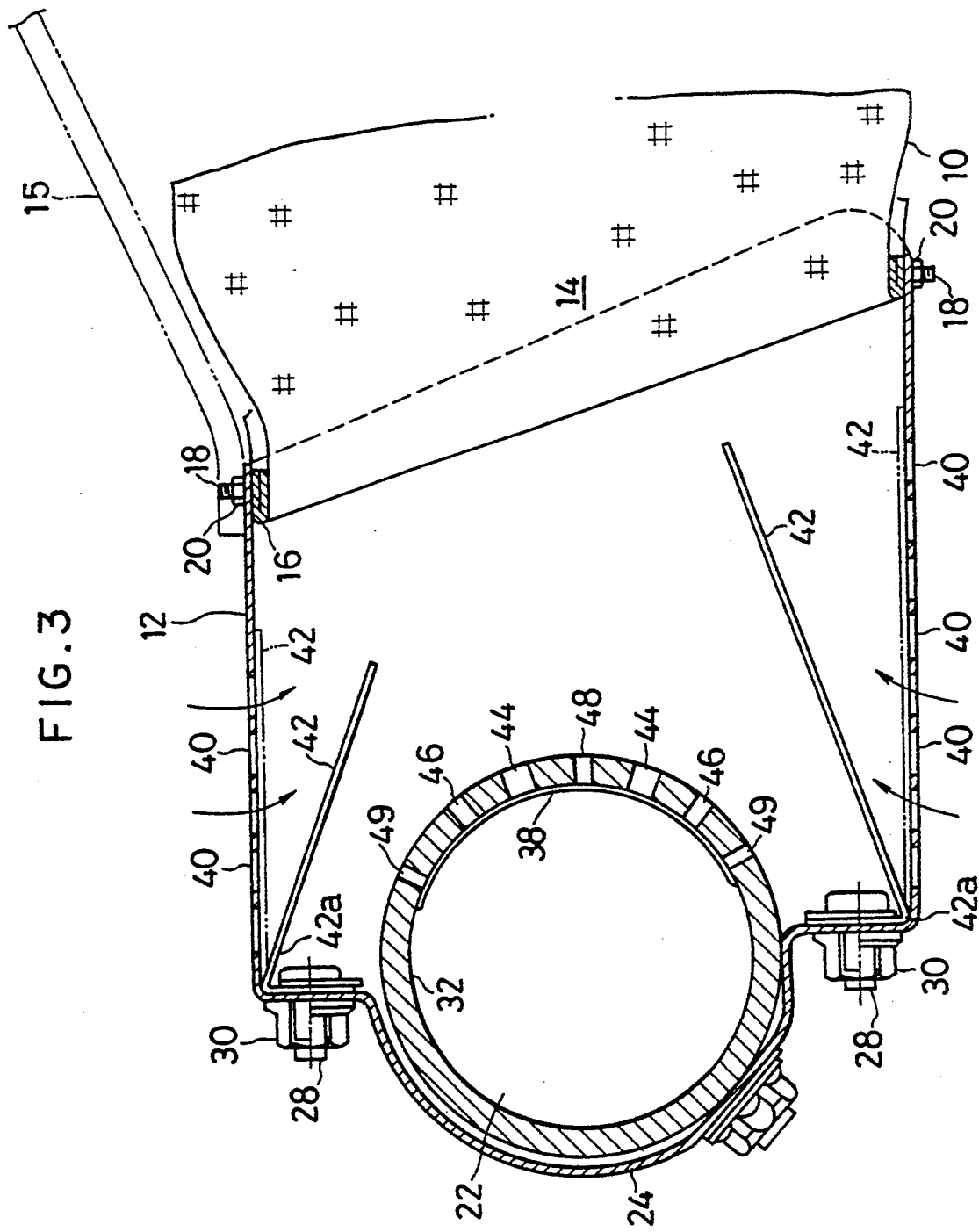
FIG. 3 is a cross-sectional view of an air bag device according to another embodiment.

FIG. 3 is a cross-sectional view showing another embodiment of the present invention. This is similar to the embodiment as shown in FIG. 1 with exception that the gas generator 22 is provided with a second ejecting hole 49 in addition to the second gas ejecting holes indicated at 46. The second gas ejecting hole 49 is provided more closely to the side portion of the gas generator than the second gas ejecting holes 46 so as to directly face to the valve plate 42. The second gas ejecting hole 49 has an opening area smaller than that of the second gas ejecting hole 46. Accordingly, the portion of the seal tape 38 covering the second gas ejecting hole 49 is broken only when the generated gas pressure in the gas generator 22 becomes remarkably high. The pressure of the gas ejected from the second gas ejecting hole 49 exerts the valve plates 42 to be pushed toward the intake ports 40, and consequently the valve plates 42 may close all of the intake ports 40.

In the embodiment mentioned above, the gas ejecting holes are covered with a tape 38 with a uniform thickness, and are different in opening area from each other. Therefore, there can be obtained different breaking pressures with one kind of tape, which makes it easy to fabricate the generator.

The present invention, however, is not limited to the above arrangement, and by changing the thickness and strength of the tape, each gas ejecting hole may be opened according to the generated gas pressure in the gas generator.

Furthermore, in place of the tape, each gas ejecting hole may be closed with a stopper whereby removing the stopper at the predetermined pressure thus opening the ejecting hole.

The number, position and size of each gas ejecting hole are suitably selected according to the size and shape of the generator.

What is claimed is:

1. An air bag device for an assistant driver's seat comprising:
    a container having an opening at a front side and intake ports at side portions;
    a lid for covering the opening of the container;
    valve plates provided in the container for opening and closing the intake ports;
    an air bag folded and situated in the container,
    a gas generator fixed to the container for generating gas to inflate the air bag through the opening of the container;
    first gas ejecting holes formed in the gas generator and orienting toward the opening for ejecting gas from the gas generator toward the opening;
    second gas ejecting holes formed in the gas generator and orienting toward the valve plates for ejecting gas from the generator toward the valve plates, each second gas ejecting hole having an opening area smaller than that of the first gas ejecting hole; and
    sealing means attached to the gas generator for sealing the first and second ejecting holes, said sealing means at the first gas ejecting holes being opened when gas ejected in the gas generator exceeds first predetermined pressure so that the ejected gas is directly supplied to the air bag while the valve plates open to allow air to flow into the air bag through the intake ports to thereby inflate the air bag by the ejected gas and air, and said sealing means at the second gas ejecting holes being opened when the gas ejected in the gas generator exceeds second predetermined pressure higher than the first predetermined pressure so that the ejected gas passing through the second gas ejecting holes is directed to the valve plates to move the valve plates toward the intake ports to thereby reduce an amount of air flowing into the air bag, said air,bag being inflated, at the second predetermined pressure, by the gas passing through the first and second ejecting holes and a small amount of air passing through the intake ports, said air bag being substantially uniformly inflated at the first and second predetermined pressures by the operation of the valve plates.

2. An air bag device as defined in claim 1, wherein said sealing means is made of a seal tape.

3. An air bag device as defined in claim 1, wherein said first and second ejecting holes are covered with the same seal tape.

4. An air bag device as defined in claim 1, wherein said gas generator is provided with a third ejecting hole for ejecting gas directly toward the front surface of said container, said third ejecting hole being covered with sealing means which opens with an ejected gas pressure exceeding said second gas pressure,.

5. An air bag device as defined in claim 4, wherein said first, second and third ejecting holes are covered with the same seal tape.

6. An air bag device as defined in claim 1, wherein said seal tape is stuck on an inner surface of said gas generator.

* * * * *